Sept. 18, 1934.  E. ZOLLINGER  1,974,353
DEVELOPING APPLIANCE
Filed April 25, 1933  3 Sheets-Sheet 1

Sept. 18, 1934.  E. ZOLLINGER  1,974,353
DEVELOPING APPLIANCE
Filed April 25, 1933   3 Sheets-Sheet 2
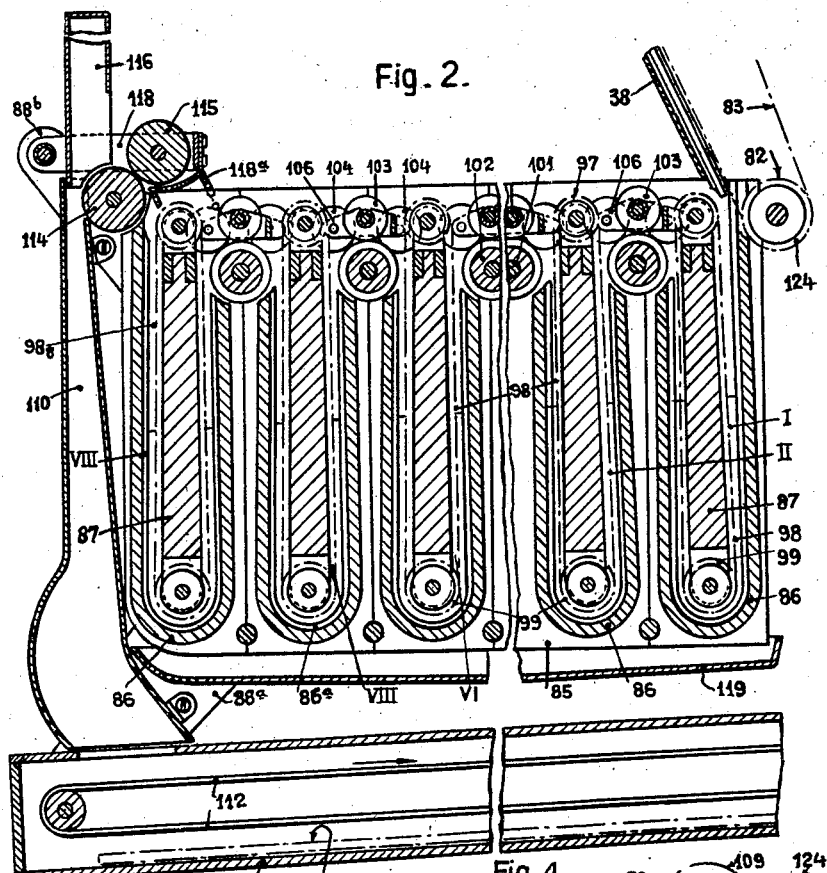
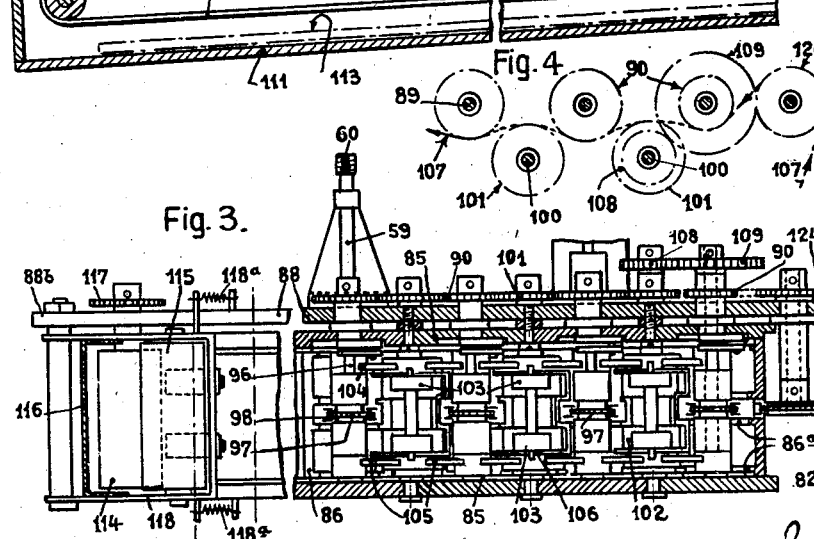

Sept. 18, 1934.  E. ZOLLINGER  1,974,353
DEVELOPING APPLIANCE
Filed April 25, 1933  3 Sheets-Sheet 3
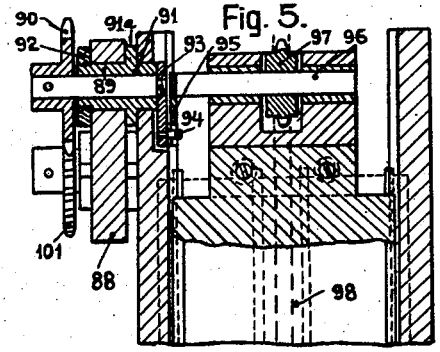
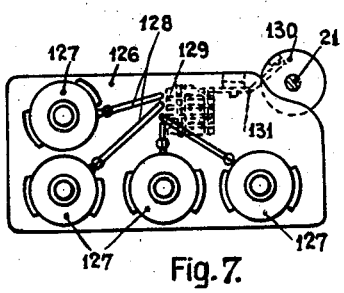
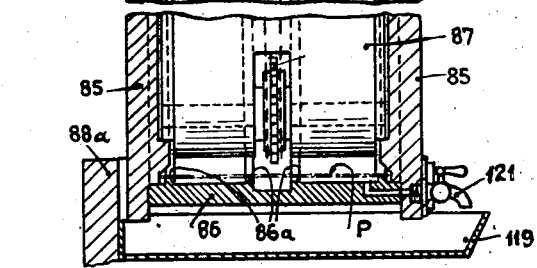
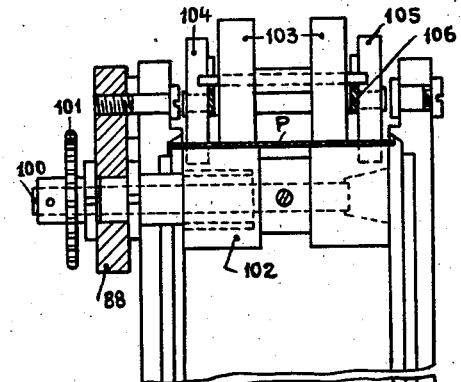
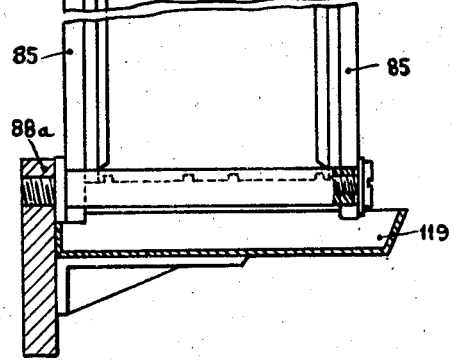
Inventor
Ernst Zollinger
By Sommers + Young
Attys.

Patented Sept. 18, 1934

1,974,353

UNITED STATES PATENT OFFICE 1,974,353

DEVELOPING APPLIANCE

Ernst Zollinger, Turin, Italy, assignor to Walter Zollinger, Zurich, Switzerland Application April 25, 1933, Serial No. 667,863
In Germany May 3, 1932

7 Claims. (Cl. 95—94)

This invention relates to an appliance for the automatic development, washing, reversing, and drying of photographs, particularly for automatic photographic apparatus, said appliance being provided with various bath containers in which the film conveying means are detachably arranged and with a picture conveying device arranged on the upper end of said container.

Appliances of this kind, as already known, are objectionable with regard to the mounting and operation of the conveying means and washing of the containers and further because the photographs when carried along through the containers, more particularly when continuous films are used, are easily damaged or cannot be led with the required uniform speed owing to the absence of a positive conveying means.

These difficulties are avoided by this invention, according to which the containers are U-shaped and are arranged adjacent to one another, and form with their sides a trough, and are each provided with a removable insert supporting the conveying means, a rail being arranged along the upper end of the appliance and carrying the driving means for the conveyor, all operating means being driven by a motor through an ordinary chain.

In automatic photographic apparatus the same motor used for the taking and conveying of photographs may serve as driving motor.

The annexed drawings show a constructional form of this invention.

Fig. 2 is an enlarged longitudinal section of the apparatus;

Fig. 3 is a horizontal section partially in plan view;

Fig. 4 is a diagrammatic view of the roller driving means;

Fig. 5 is a vertical section;

Fig. 6 is a view partially sectioned; and

Fig. 7 is a plan view on reduced size of the supply receptacle.

Figure 1:
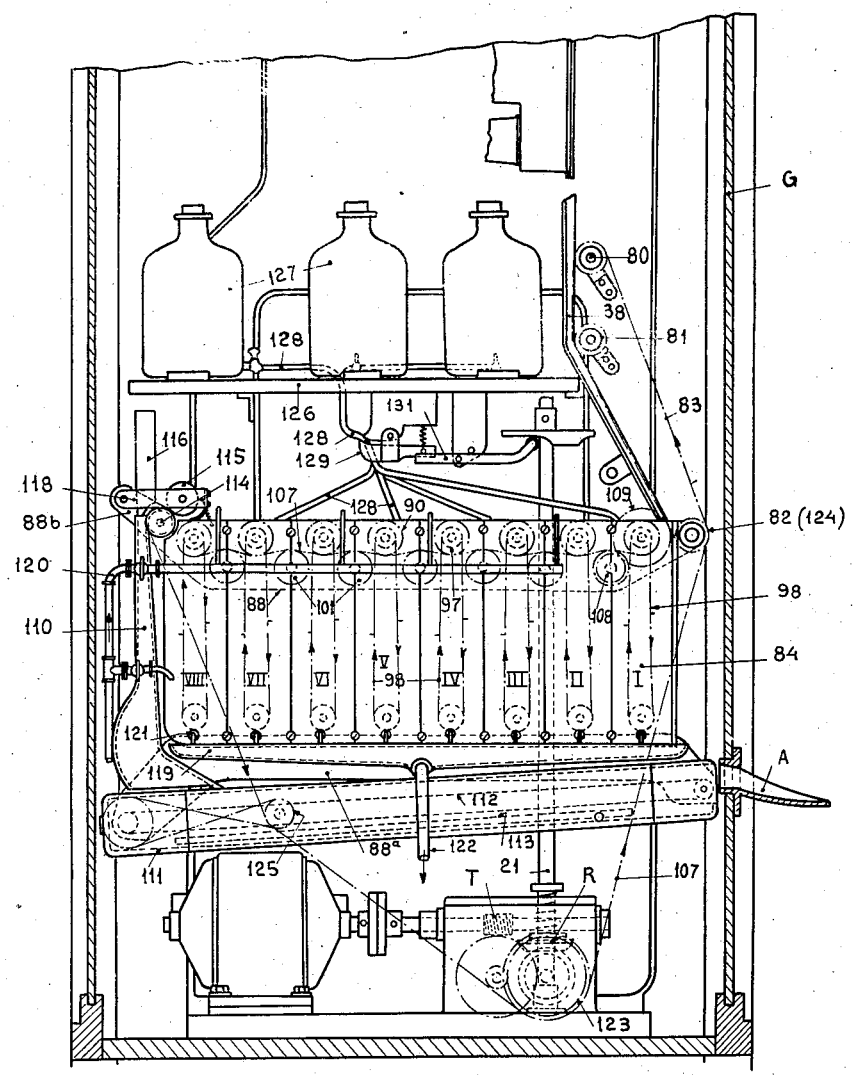
Fig. 1 shows, partly in vertical section, the whole of the apparatus and driving means.

The illustrated appliance is adapted for use in connection with an automatic photographic apparatus, only the parts of this latter required for the understanding of the invention being shown in the drawings, that is, the driving motor M, transmission gearing V and driving shaft 21.

The exposed paper sheets fall from the paper guide of the camera unit 3 into a guide channel 38 (Fig. 1) which carries them by means of a link chain 83 moving over three guide rollers 80, 81 and 82 operated by the lowermost roller 82 and provided at suitable intervals with pins which act upon the upper edge of the paper sheet and convey it positively downwardly.

This channel guides the exposed sheets into the developing and washing appliance 84 (Figs. 2-4), which is composed of side walls 85 and U-shaped trays 86 of hard rubber fitted between the former and containing the various baths, the whole being held together by means of cross bolts. An insert 87 is fitted in each tray 86, which considerably reduces the volume of the bath. Each insert 87 is provided at its front edge with guiding ribs by which it is held in corresponding grooves in the side walls in a removable manner.

The trays are provided on their inner walls with longitudinal ribs 86a, against which the paper slides on passing along. The trough 84 is fixed along the upper and lower edge on rails 88 and 88a, the driving shaft for the conveyor being mounted on the upper guides 88. The shafts 89 which carry at their outer ends sprocket wheels 90 are mounted on bushings 91, which are held on the rails 88 and kept against axial displacement by a collar 91a and an annular nut 92. A crank arm 93 is fixed to the inner end of each shaft 89 and its crank pin 94 engages a slit in a crank arm 95, which is fixed to the outer end of a sprocket wheel axis 96. This latter is mounted at the upper end of the insert 87 and carries centrally a sprocket wheel 97, from which a link chain 98 provided with a pin moves over a sprocket wheel 99 mounted on a shaft at the lower end of the insert.

The driving arrangement above described permits of the removal of the insert 87 for cleaning the trays without dismounting the driving shaft 89.

Underneath these shafts 89, shafts 100 are mounted between each tray and the next like the former in the rail 88 and carry at their outer ends sprockets 101 and centrally rubber driving rollers 102, which rest directly on the upper end 16 of the tray walls and serve for conveying the pictures P from one tray into the next (see Fig. 6). For this purpose there are provided, as counter-pressure rollers, on each driving roller 102 a pair of rollers 103 and laterally of them two further roller pairs 104 and 105, which are mounted in a common strap-shaped frame 106 so that they can be lifted bodily with this frame (Figs. 2 and 6). A chain 107 operated by a transmission gear V of the motor M moves between the sprocket wheels 90 and 101 and drives the above-mentioned axis.

The tray 1 contains the developing liquid, II the washing liquid and III to VIII contain in turn reversing fixing and washing liquids. As the pictures should remain in the developing bath a considerably longer time than in the other baths, the control of the conveyor sprocket wheel 97 is modified for this bath. The extended axis 100 of the first driving roller 102 carries a spur wheel 108, meshing with a spur wheel 109 fixed on the first sprocket wheel shaft 89, and the sprocket wheel 90 is here loosely mounted on its axis and serves as a guide wheel for the chain 107. Through this slowing down transmission the conveyor wheel 90 is driven over the first bath and the picture moves across the developing bath at a correspondingly slower rate. The shaft 89 over the tray IV is extended to the shaft 59 (Fig. 3) on which the worm screw of the worm gear 60 for driving the end switch 58 is fixed.

A delivery channel 110 is arranged at the left-hand end of the bath trough 84 and conveys the still wet final picture into the drying box 111 placed under the trough 84 (Fig. 2) in which an endless belt 112 conveys the picture over the heating resistances 113, by which it is dried, to the delivery tray A. It is essential that the pictures should be turned with their printed side upwardly, i. e. away from the resistances. To attain this, a couch roller pair 114, 115 is arranged at the end of the bath trough 84 and conveys the picture raised by the last conveyor chain 98 in a vertical position into a box 116, from which it slides with the printed side turned towards the right into a channel 110 and from the lower outlet of this channel with the picture side turned upwardly on to the belt 112. The roller 114 driven by the sprocket wheel 117 is fixedly mounted in an extension 88b of the rail 88, while the roller 115 is mounted in a pivoted frame 118 hinged at 88a and is pressed by tension rings 118a on the roller 114.

A tray 119 is arranged underneath the bath trough 84 and collects the water and other liquids conveyed through a conduit 120 and hoses connected thereto to the washing trays and discharged through outlet cocks 121 and leads said water and liquids to the outlet 122 when the apparatus is emptied.

The driving sprocket chain 107 extends from the driving sprocket wheel 123 (Fig. 1) over the sprocket wheel 124, which drives the axis of the sprocket wheel 82 between the sprocket wheels 90 and 101, then, over the sprocket wheel 117 and sprocket wheel 125 through a transmission gear operating the conveyor belt 112, back to the driving wheel 123.

For refilling the trays four bottles 127 are provided on a bracket 126 and are connected with the trays through hoses 128 (Figs. 1 and 6). For periodically opening and closing the hoses 128 a clamp 129 is provided under the supporting frame 126 for closing the four hoses under spring pressure. A cam disc 130 is fixed on the shaft 21 and controls the clamp by means of a double-armed lever 130 so that at each revolution of the shaft 21 some liquid is discharged through the hoses.

I claim:

1. In a developing appliance, particularly adapted for automatic photographic apparatus, a plurality of trays adjacent to each other, side walls for closing the ends of said trays, an insert in each of said trays, means on said inserts to cause the pictures in the trays to pass around said inserts, a rail arranged parallel to the upper edge of one of said side walls, and operating means for said conveyor mounted on said rail.

2. In a developing appliance, particularly adapted for automatic photographic apparatus, a plurality of trays adjacent to each other, side walls for closing the ends of said trays, an insert in each of said trays, a sprocket wheel at the upper end and a sprocket wheel at the lower end of each insert, a chain passing over said sprocket wheels and conveying the pictures in the trays around said insert, means for passing the pictures successively from one tray to the next, a rail arranged parallel to the upper edge of one of said side walls, and operating means for said picture conveyor mounted on said rail.

3. In a developing appliance, particularly adapted for automatic photographic apparatus, a plurality of trays adjacent to each other, side walls for tightly closing the ends of said trays, an insert in each of said trays, a sprocket wheel at the upper end and a sprocket wheel at the lower end of each insert, a chain passing over said sprocket wheels and conveying the pictures in the trays around said inserts, rubber rollers over the adjacent walls of said trays conveying the pictures successively from one tray to the next, three pairs of rollers mounted on and cooperating with each of said feeding rollers, pivoted levers supporting said three pairs of rollers, a rail arranged parallel to the upper edge of one of said side walls and operating means for said feeding rollers and picture conveying sprocket wheels mounted on said rail.

4. In a developing appliance, particularly adapted for automatic photographic apparatus, as claimed in claim 3, in which each insert is constituted by two parts connected together which can be taken apart for stretching the conveyor chain.

5. In a developing appliance, particularly adapted for automatic photographic apparatus, a plurality of trays adjacent to each other, side walls for tightly closing the ends of said trays, an insert in each of said trays, means on said inserts for conveying the pictures in the trays around said inserts, means on the adjacent walls of said trays for conveying the pictures from one tray to the next, a pair of couch rollers arranged at the outlet end of said plurality of trays, a rail arranged parallel to the upper edge of one of said side walls and operating means for said conveying and feeding means, and couch rollers mounted on said rail.

6. In a developing appliance, as claimed in claim 5, a pair of couch rollers, one of which is mounted on said rail, a pivoted arm carrying the other roller, a receptacle above said couch rollers, a guiding channel underneath said receptacle, a conveying belt fed by said guiding channel, a drying chamber in which said conveyor is fitted, so that the pictures pass through the receptacle and fall, through the guiding channel, on the conveyor with the printed side turned upwardly during passing through said drying chamber.

7. In a developing appliance, as claimed in claim 2, in which the sprocket wheel at the upper end of each insert is mounted on an axis divided into two portions, each of which is provided with a crank arm, one of said arms carrying a pin engaging a slit in the other arm, so that the insert can be easily removed independently of the operating means of said sprocket wheel.

ERNST ZOLLINGER.